(12) United States Patent
Williams et al.

(10) Patent No.: US 8,762,759 B2
(45) Date of Patent: Jun. 24, 2014

(54) RESPONDING TO INTERRUPTS WHILE IN A REDUCED POWER STATE

(75) Inventors: Scott Alan Williams, San Jose, CA (US); Aleksandr Frid, San Francisco, CA (US); Udaykumar Raval, Sunnyvale, CA (US); Shailendra Chafekar, San Diego, CA (US)

(73) Assignee: Nvidia Corporation, Santa Clara, CA (US)

( * ) Notice: Subject to any disclaimer, the term of this patent is extended or adjusted under 35 U.S.C. 154(b) by 605 days.

(21) Appl. No.: 12/100,606

(22) Filed: Apr. 10, 2008

(65) Prior Publication Data

US 2009/0259863 A1    Oct. 15, 2009

(51) Int. Cl.
*G06F 1/32* (2006.01)
*G06F 1/00* (2006.01)

(52) U.S. Cl.
USPC .......................................... 713/323; 713/340

(58) Field of Classification Search
USPC ........................ 713/310, 320–324
See application file for complete search history.

(56) References Cited

U.S. PATENT DOCUMENTS

| | | |
|---|---|---|
| 4,744,076 A | 5/1988 | Elias |
| 4,868,832 A | 9/1989 | Marrington et al. |
| 5,109,494 A | 4/1992 | Ehlig et al. |
| 5,142,690 A | 8/1992 | McMullan, Jr. et al. |
| 5,220,660 A | 6/1993 | Yoshizawa et al. |
| 5,230,067 A | 7/1993 | Buch |
| 5,274,828 A | 12/1993 | McAdams |
| 5,305,443 A | 4/1994 | Franzo |
| 5,331,346 A | 7/1994 | Shields et al. |
| 5,339,445 A | 8/1994 | Gasztonyi |
| 5,365,468 A | 11/1994 | Kakubo et al. |
| 5,386,552 A | 1/1995 | Garney |
| 5,388,265 A | 2/1995 | Volk |
| 5,396,635 A | 3/1995 | Fung |
| 5,402,492 A | 3/1995 | Goodman et al. |
| 5,408,668 A | 4/1995 | Tornai |
| 5,446,904 A | 8/1995 | Belt et al. |
| 5,471,189 A | 11/1995 | Dietz et al. |
| 5,493,670 A | 2/1996 | Douglis et al. |
| 5,510,740 A | 4/1996 | Farrell et al. |
| 5,517,441 A | 5/1996 | Dietz et al. |
| 5,524,249 A | 6/1996 | Suboh |

(Continued)

FOREIGN PATENT DOCUMENTS

| | | |
|---|---|---|
| GB | 2457170 | 12/2009 |
| WO | 2004102623 | 11/2004 |

OTHER PUBLICATIONS

"About Viewlink CSS Inheritance," http://msdn.microsoft.com/workshop/author/behaviors/overview/viewlink_ovw_css.asp; pp. 1-3, Dec. 17, 2002.

(Continued)

*Primary Examiner* — Thomas Lee
*Assistant Examiner* — Phil Nguyen

(57) ABSTRACT

To reduce power consumption, a processor can be placed into a reduced power state. Before doing so, interrupt events can be designated as wakeup events. While the processor is in the reduced power state, if an event designated as a wakeup event occurs, then a signal is directed to a wakeup event handler instead of to an interrupt handler. In response to the signal, the wakeup event handler causes power to be restored to the processor, so that the event can be subsequently serviced.

16 Claims, 4 Drawing Sheets

(56) References Cited

U.S. PATENT DOCUMENTS

| | | | | |
|---|---|---|---|---|
| 5,528,610 | A | 6/1996 | Edler et al. | |
| 5,530,845 | A | 6/1996 | Hiatt et al. | |
| 5,535,398 | A | 7/1996 | Biggs et al. | |
| 5,557,777 | A | 9/1996 | Culbert | |
| 5,586,308 | A | 12/1996 | Hawkins et al. | |
| 5,588,099 | A | 12/1996 | Mogilevsky et al. | |
| 5,594,367 | A | 1/1997 | Trimberger et al. | |
| 5,594,874 | A | 1/1997 | Narayanan et al. | |
| 5,649,222 | A | 7/1997 | Mogilevsky | |
| 5,652,885 | A | 7/1997 | Reed et al. | |
| 5,659,687 | A | 8/1997 | Kim et al. | |
| 5,687,382 | A | 11/1997 | Kojima et al. | |
| 5,737,613 | A | 4/1998 | Mensch, Jr. | |
| 5,752,050 | A | 5/1998 | Hernandez et al. | |
| 5,758,133 | A | 5/1998 | Evoy | |
| 5,790,877 | A | 8/1998 | Nishiyama et al. | |
| 5,862,368 | A | 1/1999 | Miller et al. | |
| 5,869,979 | A | 2/1999 | Bocchino | |
| 5,898,879 | A | 4/1999 | Kim | |
| 5,951,689 | A | 9/1999 | Evoy et al. | |
| 5,963,219 | A | 10/1999 | Choi | |
| 6,011,546 | A | 1/2000 | Bertram | |
| 6,029,170 | A | 2/2000 | Garger et al. | |
| 6,034,544 | A | 3/2000 | Agrawal et al. | |
| 6,040,845 | A | 3/2000 | Melo et al. | |
| 6,057,705 | A | 5/2000 | Wojewoda et al. | |
| 6,057,789 | A | 5/2000 | Lin | |
| 6,061,410 | A | 5/2000 | Linz | |
| 6,061,679 | A | 5/2000 | Bournas et al. | |
| 6,065,122 | A * | 5/2000 | Wunderlich et al. | 713/320 |
| 6,118,462 | A | 9/2000 | Margulis | |
| 6,131,167 | A * | 10/2000 | Cruz | 713/320 |
| 6,134,167 | A | 10/2000 | Atkinson | |
| 6,141,737 | A | 10/2000 | Krantz et al. | |
| 6,163,583 | A | 12/2000 | Lin et al. | |
| 6,169,546 | B1 | 1/2001 | Bogdan | |
| 6,169,984 | B1 | 1/2001 | Bogdan | |
| 6,178,523 | B1 | 1/2001 | Klein | |
| 6,191,969 | B1 | 2/2001 | Pereira | |
| 6,191,970 | B1 | 2/2001 | Pereira | |
| 6,212,645 | B1 | 4/2001 | Tjandrasuwita | |
| 6,216,234 | B1 | 4/2001 | Sager et al. | |
| 6,226,661 | B1 | 5/2001 | Savell | |
| 6,243,280 | B1 | 6/2001 | Wong et al. | |
| 6,249,284 | B1 | 6/2001 | Bogdan | |
| 6,252,919 | B1 | 6/2001 | Lin | |
| 6,266,776 | B1 | 7/2001 | Sakai | |
| 6,347,370 | B1 | 2/2002 | Grimsrud | |
| 6,397,340 | B2 | 5/2002 | Watts, Jr. et al. | |
| 6,523,128 | B1 | 2/2003 | Stapleton et al. | |
| 6,538,947 | B2 | 3/2003 | Ahmed et al. | |
| 6,539,120 | B1 | 3/2003 | Sita et al. | |
| 6,552,596 | B2 | 4/2003 | Cowles et al. | |
| 6,584,003 | B1 | 6/2003 | Kim et al. | |
| 6,600,345 | B1 | 7/2003 | Boutaud | |
| 6,600,575 | B1 | 7/2003 | Kohara | |
| 6,678,831 | B1 | 1/2004 | Mustafa et al. | |
| 6,690,219 | B2 | 2/2004 | Chuang | |
| 6,690,836 | B2 | 2/2004 | Natarajan et al. | |
| 6,694,451 | B2 | 2/2004 | Atkinson | |
| 6,717,435 | B1 | 4/2004 | Mitsumori et al. | |
| 6,728,959 | B1 | 4/2004 | Merkey | |
| 6,747,581 | B2 | 6/2004 | Hodges | |
| 6,748,408 | B1 | 6/2004 | Bredin et al. | |
| 6,754,837 | B1 | 6/2004 | Helms | |
| 6,760,850 | B1 | 7/2004 | Atkinson et al. | |
| 6,762,768 | B2 | 7/2004 | Dilliplane | |
| 6,765,958 | B1 | 7/2004 | Dowling | |
| 6,768,659 | B2 | 7/2004 | Gillingham et al. | |
| 6,775,776 | B1 | 8/2004 | Vogt et al. | |
| 6,804,267 | B1 | 10/2004 | Long et al. | |
| 6,804,763 | B1 | 10/2004 | Stockdale et al. | |
| 6,816,809 | B2 | 11/2004 | Circenis | |
| 6,845,434 | B2 | 1/2005 | Lin | |
| 6,845,456 | B1 | 1/2005 | Menezes et al. | |
| 6,877,098 | B1 | 4/2005 | Lavelle et al. | |
| 6,901,298 | B1 | 5/2005 | Govindaraj et al. | |
| 6,965,974 | B1 | 11/2005 | Bays et al. | |
| 6,990,594 | B2 | 1/2006 | Kim | |
| 7,043,649 | B2 | 5/2006 | Terrell, II | |
| 7,058,834 | B2 | 6/2006 | Woods et al. | |
| 7,061,409 | B2 | 6/2006 | Jantti et al. | |
| 7,100,013 | B1 | 8/2006 | de Waal | |
| 7,106,224 | B2 | 9/2006 | Knapp et al. | |
| 7,107,427 | B2 | 9/2006 | Nakano et al. | |
| 7,174,472 | B2 | 2/2007 | Hill | |
| 7,187,205 | B2 | 3/2007 | Ramaraju et al. | |
| 7,256,232 | B2 | 8/2007 | Lamaze et al. | |
| 7,277,101 | B2 | 10/2007 | Zeng | |
| 7,285,980 | B2 | 10/2007 | Bansal et al. | |
| 7,401,240 | B2 | 7/2008 | Heller, Jr. et al. | |
| 7,414,550 | B1 | 8/2008 | Sudharsanan | |
| 7,426,647 | B2 | 9/2008 | Fleck et al. | |
| 7,428,644 | B2 | 9/2008 | Jeddeloh et al. | |
| 7,432,921 | B2 | 10/2008 | Oshima et al. | |
| 7,434,072 | B2 | 10/2008 | Peirson et al. | |
| 7,471,120 | B2 | 12/2008 | Lou | |
| 7,529,958 | B2 | 5/2009 | Roth et al. | |
| 7,583,104 | B2 | 9/2009 | Simmons et al. | |
| 7,590,815 | B1 | 9/2009 | de Waal | |
| 7,599,317 | B2 | 10/2009 | Schaap | |
| 7,624,215 | B2 | 11/2009 | Axford et al. | |
| 7,631,117 | B2 | 12/2009 | Aida et al. | |
| 7,739,533 | B2 | 6/2010 | Rauschmayer et al. | |
| 7,779,284 | B2 * | 8/2010 | Kumar et al. | 713/324 |
| 8,327,173 | B2 | 12/2012 | Hendin et al. | |
| 2001/0044909 | A1 | 11/2001 | Oh et al. | |
| 2002/0046204 | A1 | 4/2002 | Hayes | |
| 2002/0172008 | A1 | 11/2002 | Michael | |
| 2003/0014677 | A1 * | 1/2003 | Howard et al. | 713/323 |
| 2003/0023825 | A1 | 1/2003 | Woo et al. | |
| 2003/0028751 | A1 | 2/2003 | McDonald et al. | |
| 2003/0093702 | A1 | 5/2003 | Luo et al. | |
| 2003/0204757 | A1 | 10/2003 | Flynn | |
| 2003/0204761 | A1 | 10/2003 | D'Alessio | |
| 2003/0206164 | A1 | 11/2003 | Juenger | |
| 2003/0233525 | A1 | 12/2003 | Reeves | |
| 2004/0015732 | A1 * | 1/2004 | El-Kik et al. | 713/300 |
| 2004/0128574 | A1 | 7/2004 | Ricci et al. | |
| 2004/0224728 | A1 | 11/2004 | Dacosta et al. | |
| 2005/0015321 | A1 | 1/2005 | Vindekilde | |
| 2005/0125705 | A1 | 6/2005 | Cheng et al. | |
| 2005/0216643 | A1 | 9/2005 | Munguia | |
| 2005/0285726 | A1 * | 12/2005 | Haswell et al. | 340/445 |
| 2006/0136766 | A1 * | 6/2006 | Kim et al. | 713/323 |
| 2006/0184808 | A1 | 8/2006 | Chua-Eoan et al. | |
| 2006/0226895 | A1 | 10/2006 | Hoshi et al. | |
| 2007/0198759 | A1 * | 8/2007 | Agarwal | 710/260 |
| 2007/0257710 | A1 | 11/2007 | Mari et al. | |
| 2007/0300092 | A1 | 12/2007 | Kurita | |
| 2008/0082847 | A1 | 4/2008 | Lee et al. | |
| 2008/0155282 | A1 | 6/2008 | Gammie et al. | |
| 2009/0070621 | A1 | 3/2009 | Yanagi | |
| 2009/0204835 | A1 | 8/2009 | Smith et al. | |

OTHER PUBLICATIONS

"About Viewlink Event Routing," http://msdn.microsoft.com/workshop/author/behaviors/overview/viewlink_ovw_events.asp; pp. 1-3, Dec. 17, 2002.

"Benefits of using ViewLink," http://msdn.microsoft.com/workshop/samples/author/behaviors/overview/vlcomparison.htm, p. 1, Dec. 17, 2002.

"create TextRange Method," http://msdn.microsoft.com/workshop/author/dhtml/reference/methods/createtextrange.asp, pp. 1-2, Dec. 17, 2002.

"Introduction to Markup Services," http://msdn.microsoft.com/workshop/browser/mshtml/overview/intromarkupsvc.asp, pp. 1-12, Feb. 12, 2002.

"Introduction to ViewLink," http://msdn.microsoft.com/workshop/author/behaviors/overview/viewlink_ovw.asp, pp. 1-9, Dec. 17, 2002.

"Microsoft Brandishes its Trident," http://news.com.com/2100-1001-239879.html?tag=mainstry, pp. 1-2, Oct. 21, 1996.

(56) References Cited

OTHER PUBLICATIONS

"splay tree," http://searchdatabase.techtarget.com/sDefinition/0,,sid13_gci511191,00.html, pp. 1-3, Feb. 12, 2002.

Zukowski et al. "Use of Selective Precharge for Low Power on the Match Lines of Content-Addressable Memories", 0-8186-8099-7/97, 1997 IEEE.

Advanced Configuration and Power Interface Specification Revision 3.0b Oct. 2006 entire document.

"Viewlink Behaviors," http://msdn.microsoft.com/workshop/author/behaviors/overview/viewlink_ovw_entry.asp, pp. 1, Dec. 17, 2002.

"W3C, Xforms 1.0, W3C Working Draft," http://www.w2.org/TR/2002/WD-xforms-20020118, pp. 1-97, Jan. 18, 2002.

"What is XUL?" Chapter 1, pp. 1-18, Jul. 10, 2001.

"XBL-XML Binding Language," http://www.w3.org/TR/xbl/, Hyatt (ed.), pp. 1-35, Feb. 23, 2001.

"Xforms—The Next Generation of Web Forms," http://www.w3.org/MarkUp/Forms/, pp. 1-6, 2001.

Henrich, "A Hybrid Split Strategy for k-d-Tree Based Access Structures," ACM Proceedings of the Fourth ACM Workshop on Advances in Geographic Information Systems, pp. 1-8, 1997.

IEEE Journal of Solid-State Circuits, vol. 42, No. 1, Jan. 2007.

Khuller et al., "Graph and Network Algorithms," The Computer Science ad Engineering Handbook, Tucker, Jr. (ed.), pp. 203-225, 1997.

Manohararajah, "Parallel Alpha-Beta Search on Shared Memory Multiprocessors," pp. 1-92, Apr. 24, 2002.

McEneaney, "Visualizing and Assessing Navigation in Hypertext," ACM Proceedings of the Tenth ACM Conference on Hypertext and Hypermedia: Returning to our Diverse Roots, pp. 61-70, 1999.

Samet, The Design and Analysis of Spatial Data Structures, Addison-Wesley, Reading, MA, pp. 240-257, 1990.

Tamassia et al., "Data Structures," The Computer Science and Engineering Handbook, Tucker, Jr. (ed.), pp. 86-110, 1997.

Turbak, "Slivers: computational Modularity via Synchronized Lazy Aggregates," http://nike.wellesley.edu/~fturbak/pubs/phd/, pp. 1-2, Apr. 24, 2002.

Yao, "Tree Structures Construction Using Key Densities," ACM Proceedings of the 1975 Annual Conference, pp. 337-342, 1975.

Structured Computer Organization third edition Andrew S. Tanenbaum 1990, pp. 11-13.

* cited by examiner

RESPONDING TO INTERRUPTS WHILE IN A REDUCED POWER STATE

FIELD

Embodiments according to the present invention generally relate to power management in limited-powered devices.

BACKGROUND

Power consumption is of particular concern in limited-power devices (e.g., battery-powered devices) such as laptop and notebook computer systems, cell phones, personal digital assistants (PDAs), portable media players, remote control units, hand-held devices including video game players, and the like. These devices are limited in size and weight and generally portable, and therefore they typically use smaller and lighter batteries of limited capacity. However, these types of devices may be used for a variety of computationally intensive and therefore power-hungry applications such as three-dimensional (3D) rendering and video encoding and decoding. As a result, such devices can usually be used only for relatively short periods of time before their batteries need to be recharged.

One way to reduce power consumption is to turn off or reduce power to selected components when possible. For example, certain components can be powered off or placed into a sleep state if they are not used or needed for a prescribed period of time.

SUMMARY

An electronic device may include a central processing unit (CPU), additional processors such as, for example, an audio/video processor (AVP), and other functional components such as buses and memory controllers. Although the CPU and the other components may be coupled, they can generally perform certain tasks and functions independent of each other. Thus, for example, while the AVP is executing a particular task, it may be possible to shut down the CPU in order to conserve power. As described more fully below, the CPU can be powered independently of other components so that, in some situations, the CPU can be placed into a "reduced power state" while other components (e.g., the AVP) remain at full power.

As used herein, the term "reduced power state" refers to a state in which the amount of power supplied to the CPU is less than full (normal) power, and specifically includes the case in which no power is supplied to the CPU. For simplicity of discussion, the term "reduced power state" includes the period of time when the CPU is at a reduced power level, as well as the period of time when the CPU is transitioning to the reduced power level. Exceptions to this terminology may occur but will be evident within the context of the surrounding discussion.

While the CPU is in the reduced power state, it may be desirable to ignore certain types of events so that the CPU is not unnecessarily awakened. On the other hand, there are times when it is necessary to restore full power to the CPU so that it can handle events—such as interrupt events—that can occur because other components (e.g., the AVP) may be active even though the CPU is in a reduced power state. Described below are methods and systems that can be used to efficiently place the CPU into a reduced power state and to decide when to restore full power to the CPU after the CPU has been placed into a reduced power state.

According to embodiments of the invention, the CPU prepares to enter a reduced power state by specifying conditions (presets) that will go into effect when the CPU enters the reduced power state and that will remain in effect while the CPU is at reduced power.

In one embodiment according to the invention, certain interrupt events are designated as wakeup events. Other types of events, in addition to interrupt events, may also be designated as wakeup events. While the CPU is in a reduced power state, if an event designated as a wakeup event occurs, then a signal is directed to a wakeup event handler instead of, or in addition to, an interrupt handler. In response to the signal, the wakeup event handler causes full power to be restored to the CPU, so that the event can be subsequently serviced. In one particular embodiment of the invention, the wakeup event handler (e.g., a power management interface) sends a signal to a power management unit (PMU) that is connected between the CPU and a power source (e.g., a battery). In response to the signal, the PMU restores power to the power rail that supplies the CPU.

In one embodiment according to the invention, after the CPU specifies the conditions that are to go into effect when it enters a reduced power state, the CPU sets an enable bit as one of its last acts, if not its last act, before entering the reduced power state. The CPU continues to function in its normal fashion up to the point at which the enable bit is set. After the enable bit is set, the specified conditions are active and remain active until the enable bit is de-asserted (e.g., when full power is restored to the CPU).

In one embodiment according to the invention, the transition to the reduced power state is accomplished in hardware using a state machine. The state machine can perform the actions associated with entering the reduced power state without relying on the CPU. Accordingly, once a decision is made to place the CPU into the reduced power state, there is no need to delay implementation of that decision. In other words, if the transition was implemented in software instead of in hardware, it would be necessary to delay reducing power to the CPU to allow the CPU enough time to complete execution of the software instructions that need to be executed before the CPU is completely powered down. The length of the delay needs to be generous to make sure the CPU has enough time to perform the activities required, and as a result the CPU may operate at full power longer than actually necessary. By accomplishing the transition automatically in hardware alone, power can be removed from the CPU earlier, which helps conserve power. Also, by accomplishing the transition in hardware instead of in software, a race between removing power to the CPU and stopping the CPU clock is avoided. When software controls the CPU power-down procedure, if the CPU power reaches a critical threshold before the clock is completely stopped, then the CPU may behave unpredictably, with unpredictable results. The hardware state machine assures that power down occurs in an orderly fashion.

In summary, according to embodiments of the present invention, the CPU can be placed in a reduced power state (e.g., powered down completely). However, power can be restored to the CPU so that it can respond to events, such as interrupt events, that may occur while the CPU is in the reduced power state. More specifically, before the CPU enters the reduced power state, it designates interrupt events, and perhaps other types of events, as wakeup events that cause power to be restored to the CPU should such an event occur while the CPU is in the reduced power state. Accordingly, hardware (e.g., a power management interface) can respond to a designated event by awakening the CPU so that the event can be serviced.

Thus, power is conserved by placing the CPU in a reduced power state when conditions dictate that it is appropriate to do so, but the capability remains for the CPU to respond to interrupt events.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
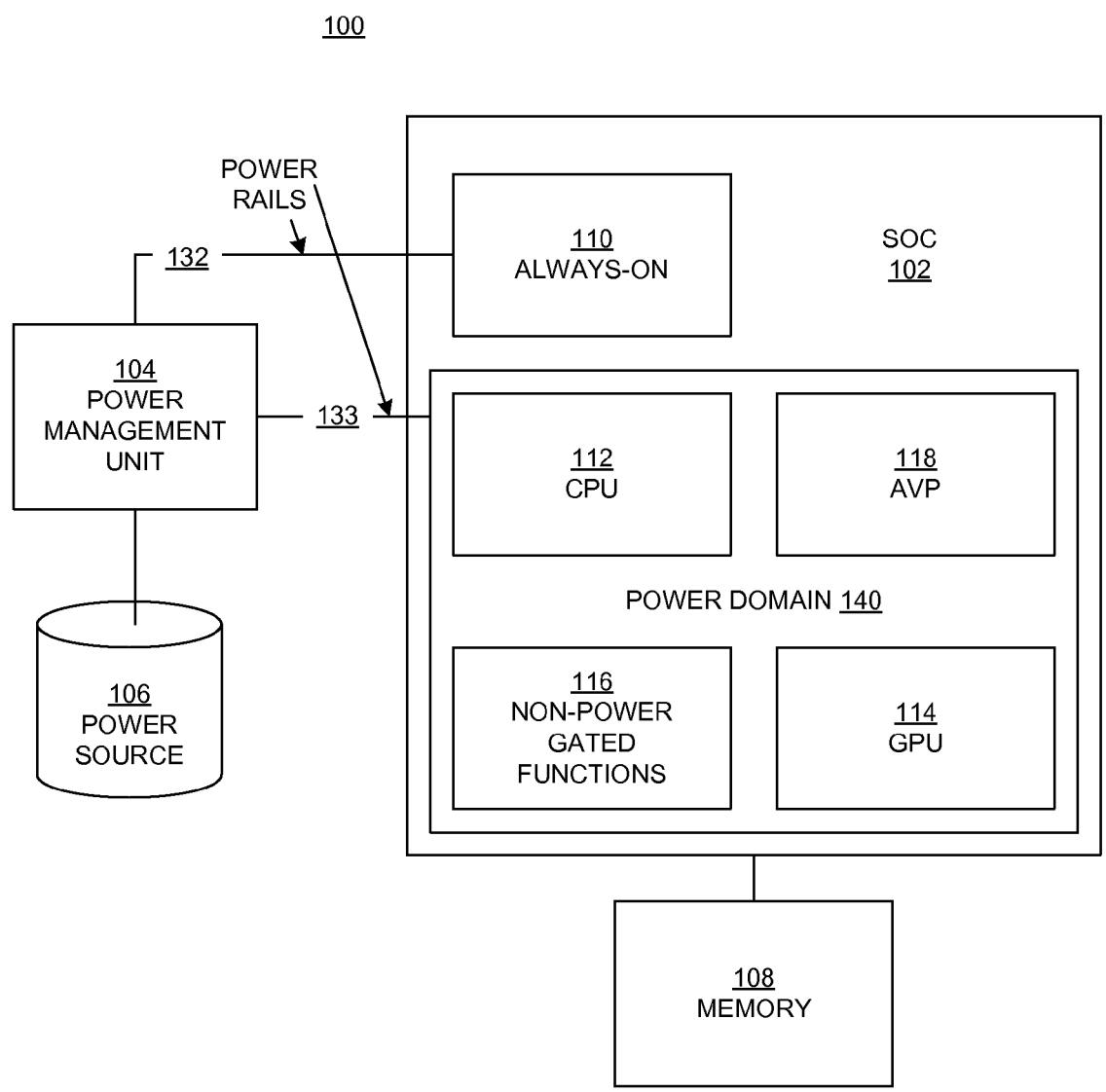
FIG. 1 is a block diagram of a power management system according to one embodiment of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending," "signaling," "setting," "enabling," "performing," "determining," "designating," "placing," "backing up," "operating," "experiencing," "directing," "latching" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram of a system 100 upon which embodiments according to the present invention may be implemented. FIG. 1 depicts the components of a basic system in accordance with embodiments of the present invention that provide the execution platform for certain hardware-based and software-based functionality. Embodiments in accordance with the present invention may be implemented on platforms that include functionality, components and devices other than those included in the system 100. The system 100 can be implemented as part of, for example, a battery-operated and/or portable device such as, but not limited to, a laptop or notebook computer system, cell phone, personal digital assistant, portable media player (an audio and/or video player), a remote control unit, a hand-held device such as a video game player, and the like.

In the embodiment of FIG. 1, the system 100 includes a system-on-a-chip (SOC) 102, a power management unit (PMU) 104, a power source 106, and a memory 108. The SOC 102 includes an always-on module 110, a central processing unit (CPU) or processor 112, a graphics (3D) processing unit (GPU) 114, non-power gated functions 116, and an audio/video processor (AVP) 118 (e.g., a multimedia player or decoder). These elements are interconnected using one or more buses (not shown).

The CPU 112 can access the memory 108 via a bridge component/memory controller (not shown), or the CPU 112 can be directly coupled to the memory 108 via a memory controller (not shown) internal to the CPU 112. The memory 108 facilitates storage of component (e.g., context or state), application, and operating system information for SOC 102. For example, the memory 108 may be used to store context information and other information when portions of SOC 102 enter reduced power states.

The power source 106 provides power to the system 100. The power source 106 may include, for example, one or more batteries or the like.

The PMU 104 regulates power to the SOC 102. In the example of FIG. 1, the PMU 104 is illustrated as being external to the SOC 102; however, the PMU 104 may instead be implemented as a part of the SOC 102. In one embodiment, the PMU 104 provides power to the SOC 102 via power rails coupled to selected components or groups of components, referred to as power domains. For example, the power domain 140 includes the CPU 112, the GPU 114, the AVP 118, and the non-power gated functions 116. In the example of FIG. 1, the PMU 104 provides power to the always-on module 110 via a power rail 132, and to the power domain 140 via a power rail 133. A power rail may be switched on/off or power-gated.

In general, each power rail provides power to a single power domain that includes one or more components. Thus, power domains can be independently turned off and on (e.g., independently power-gated)—one power domain can be on while another power domain is off. Within a power domain that contains multiple components, the power to each of the components can be independently controlled (e.g., independently power-gated and/or clock-gated). That is, one component in a power domain may be reduced in power or turned off while another component within the same power domain remains at full power. Accordingly, for example, the CPU 112 may be turned off or reduced in power while the AVP 118 remains at full power. In the FIG. 1 embodiment, the non-power gated functions 116 can be clock-gated but are not power-gated.

In the example of FIG. 1, the always-on module 110 is a power domain that remains powered while other portions of the SOC 102 are put into a reduced power state. The always-on module 110 thus facilitates the components of the SOC 102 (e.g., the CPU 112, GPU 114, AVP 118, and non-powered gated functions 116) as they enter and exit reduced power states. The always-on module 110 may include resources (e.g., registers and the like) for storing information to facilitate components of the SOC 102 that enter into a reduced power state, allowing those components to recover their internal state (context information) after waking from the reduced power state. The always-on module 110 is not literally always on—it may be powered off when a user turns off the system 100. However, after a user turns on the system 100, the always-on module 110 remains on, even if all other components have entered reduced power states. That is, the always-on module 110 remains on once a user turns on the system 100 and remains on until a user turns off the system 100.

Table 1 below provides examples of the types of power states that can be implemented on the system 100.

TABLE 1

Examples of Power States

| Power State | Always-On Module 110 | Power Domain 140 |
|---|---|---|
| Off | Off | Off |
| Low Reduced Power State (LP0) | On | Off |
| Intermediate Reduced Power State (LP1) | On | Components within the domain are selectively power-gated and/or clock-gated |
| Full On | On | On |

The always-on domain 110 and the power domain 140 are both turned off, with no power consumption, in the off state. In the off state, the device (e.g., the system 100) is turned off by, for example, a user pressing an on/off button on the larger device. In one reduced power state, referred to herein as the LP0 state and sometimes also referred to as a deep sleep state, the always-on domain 110 is on and the power domain 140 is off (e.g., the power rail 133 is switched off or power-gated, or the power domain 140 is power-gated). In another reduced power state, referred to herein as the LP1 state and sometimes also referred to as the suspended power state, the always-on domain 110 is on and components within the power domain 140 are selectively and independently power-gated and/or clock-gated. In the full-on power state, both the always-on domain 110 and the power domain 140 are on.

In the LP1 state, the CPU 112 may be power-gated while other components (e.g., the AVP 118) may be fully powered or possibly clock-gated. Generally speaking, the CPU 112 may be placed in a reduced power state while other components remain active. As noted previously herein, the reduced power state may be one in which all power is removed from the CPU 112—the CPU is completely shut down. Also, for example, pins on the CPU 112 may be clamped so that they cannot be driven after power is removed from the CPU, so that spurious signals are not sent to downstream components, in particular while the CPU is transitioning to the reduced power state.

While the CPU 112 is in a reduced power state, it may be desirable to ignore certain types of events so that the CPU is not unnecessarily awakened. However, it may be necessary to restore full power to the CPU 112 for other types of events—such as interrupt events—that can occur because, as mentioned above, other components may be active.

Figure 2:
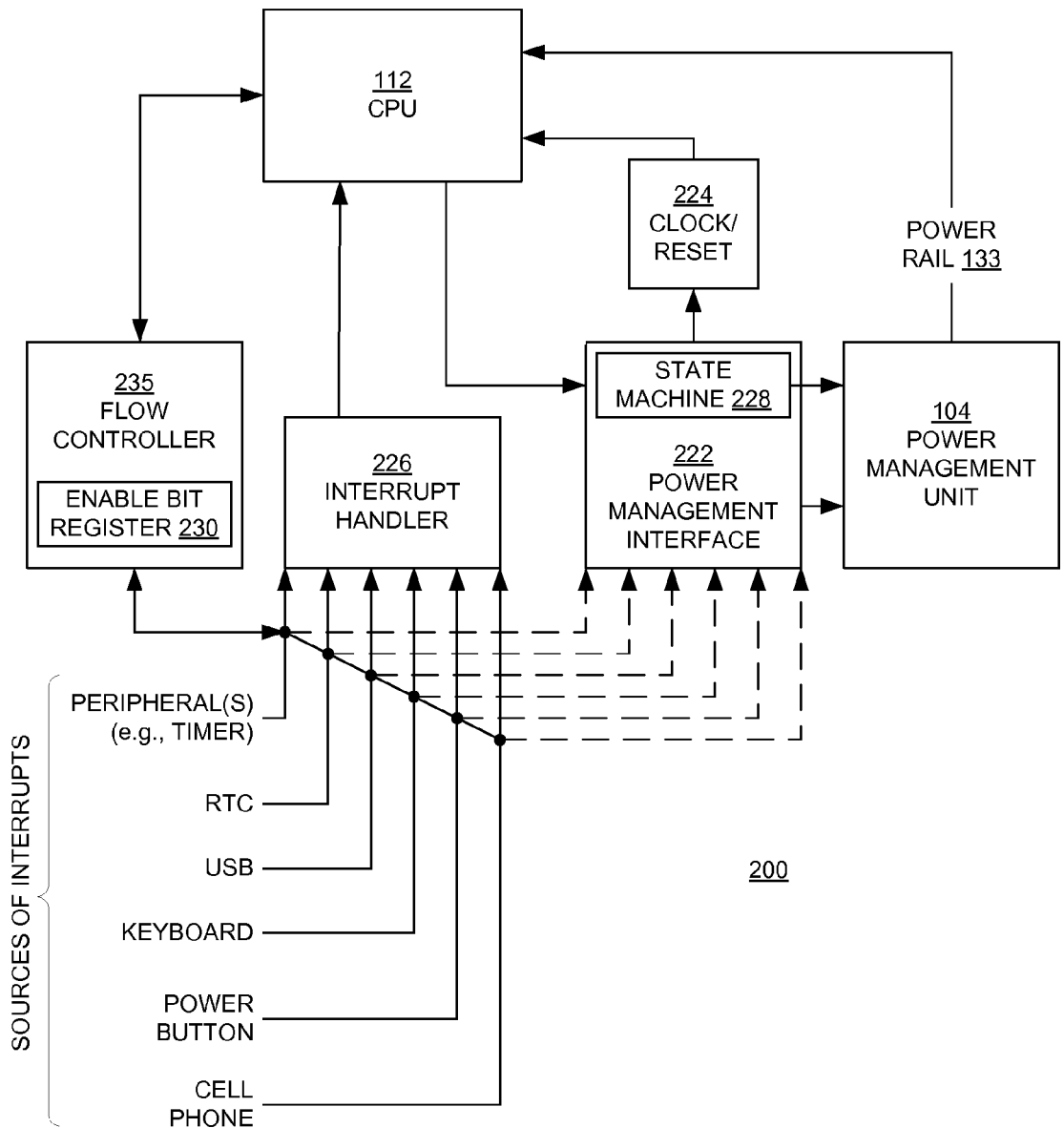
FIG. 2 is a block diagram of a system for handling events in a reduced power state according to one embodiment of the present invention.

FIG. 2 is a block diagram of one embodiment of a system 200 that can be used with the system 100 of FIG. 1 to decide when to restore full power to the CPU 112 after the CPU has been placed into a reduced power state. In addition to the elements of the system 100 described above, the system of FIG. 2 includes a power management interface (PMIF) 222, a clock/reset module 224, an interrupt handler 226, and a flow controller 235. The PMIF 222 may also be referred to as a wakeup event handler. In the example of FIG. 2, the PMIF 222 includes a state machine 228, and the flow controller 235 includes an enable bit register 230.

While certain components are shown as separate blocks in FIG. 2, the functionality provided by multiple blocks may be implemented within a single component. For example, the flow controller 235 may be implemented as part of the interrupt handler 226 or the PMIF 222. Additionally, the functionality provided by a particular block may be distributed across multiple blocks. For example, the state machine 228 may be implemented across both the interrupt handler 226 and the power management interface 222.

The flow controller 235 can be used to control the clocks for the various components such as the CPU 112, the GPU 114, the non-power gated functions 116, and the AVP 118 (FIG. 1). In general, the flow controller 235 includes a programmable engine that allows clocks to be selectively turned on and off, thus helping to reduce power consumption.

In one embodiment of the invention, the PMIF 222 of FIG. 2 is implemented as part of the always-on module 110 (FIG. 1). The PMIF 222 signals the PMU 104 to adjust the power levels provided to the various components of the SOC 102 (FIG. 1) including the CPU 112. When conditions dictate, the PMIF 222 can signal the PMU 104 to decrease power to the CPU 112 (e.g., shut it down). As will be seen, the PMIF 222 can also signal the PMU 104 to increase power (restore full power) to the CPU 112 in response to the occurrence of an event designated as a wakeup type of event. When power is being restored to the CPU 112, the clock/reset module 224 holds the CPU 112 in a reset condition until the power to the CPU is stable, at which point the reset can be removed, restore code can be executed, and previously stored context information can be restored to the CPU.

In one embodiment according to the invention, the transition of the CPU 112 to a reduced power state is accomplished in hardware using the state machine 228. Because it accomplishes the transition in hardware, the state machine 228 does not need to rely on the CPU 112. Accordingly, once a decision is made to place the CPU 112 into the reduced power state, there is no need to delay implementation of that decision. By accomplishing the transition in hardware instead of in software, a race between removing power to the CPU 112 and stopping the CPU clock is avoided. When software controls the CPU power-down procedure, if the CPU power reaches a critical threshold before the clock is completely stopped, then the CPU may behave unpredictably, with unpredictable results. The hardware state machine 228 assures that power-down occurs in an orderly fashion.

Furthermore, if the transition was accomplished using software instead of in hardware, it would be necessary to delay reducing power to the CPU 112 by a prescribed amount of time in order to give the CPU enough time to execute the software required for power-down. By accomplishing the transition automatically in hardware independent of the functionality of the CPU 112, power can be removed from the CPU earlier than it would have been if the transition was handled using software.

According to embodiments of the invention, while at full power, the CPU 112 prepares to enter a reduced power state by specifying a set of conditions (presets) that will go into effect when the CPU enters the reduced power state and that will remain in effect while the CPU is at reduced power. After the CPU 112 enters the reduced power state, the presets are executed in hardware, as described below. As such, the presets can be executed without any further involvement on the part of the CPU 112, meaning that they can be performed even with the CPU completely inactive (e.g., shut down).

In one embodiment according to the invention, certain interrupt events are designated as wakeup events. The set of wakeup events can be specified using writes to registers that reside in, for example, the PMIF 222 (FIG. 2). For example, an interrupt mask can be specified, in which certain inputs to the SOC 102 (FIG. 1) are designated as wakeup events. In other words, the presence of a signal on a particular input/output pin of the SOC can be used to indicate that an event designated as a wakeup event has occurred. The types of events that may be designated as wakeup events include, but are not limited to, signals (e.g., interrupts) from sources such as peripheral devices (e.g., a timer, removable storage slot), a real time clock, a Universal Serial Bus (USB) port (e.g., a cable is inserted), a keyboard (e.g., a key is pressed), a touch panel (e.g., the screen is touched), a power button (e.g., a built-in camera is turned on), and a built-in cell phone interface (e.g., there is an incoming call). Other types of events, in addition to interrupt events, can be designated as wakeup events.

In one embodiment according to the invention, once the process of designating interrupt events as wakeup events is complete, the CPU 112 writes an enable bit to the register 230 as one of its last acts, and perhaps as its last act, before entering the reduced power state. Effectively, the CPU 112 can enter the reduced power state immediately after the enable bit is set—no other actions need be completed before power to the CPU is reduced. The CPU 112 continues to function in its normal fashion up to the point at which the enable bit is set. After the enable bit is set, the CPU 112 is powered down and the predefined conditions are activated. The predefined conditions remain active until the enable bit is de-asserted (e.g., when full power is restored to the CPU 112).

If an event designated as a wakeup event occurs while the CPU 112 is in a reduced power state, then a signal is directed to the wakeup event handler (e.g., the PMIF 222). In response to the signal, the wakeup event handler signals the PMU 104 to restore full power to the CPU 112, so that the event can be subsequently serviced.

Figure 3:
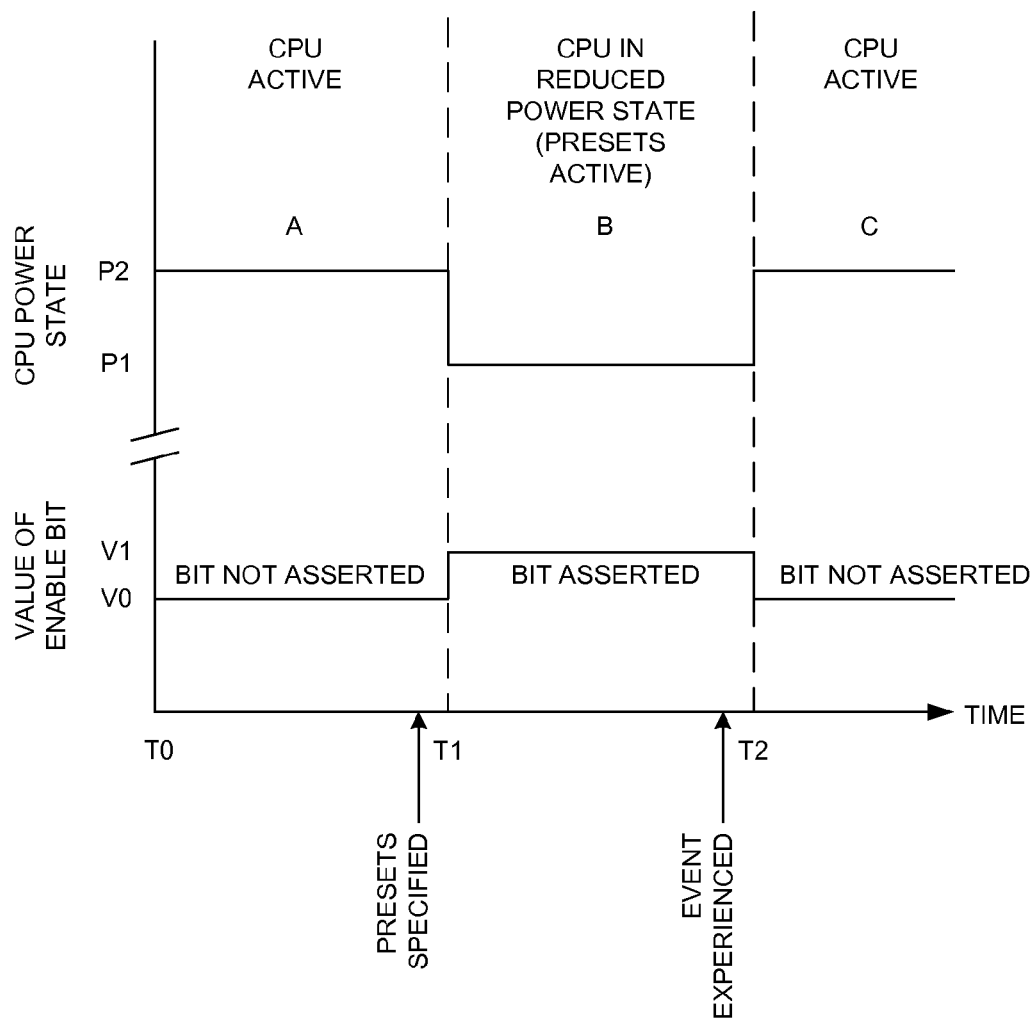
FIG. 3 is a timeline illustrating power versus time according to one embodiment of the present invention.

Additional information is provided in conjunction with FIG. 3, which is a timeline illustrating a sequence of events for reducing and restoring power to the CPU 112 according to one embodiment of the present invention. FIG. 3 is described with reference to the elements of FIGS. 1 and 2.

In region A of FIG. 3, from time T0 to time T1, the CPU 112 is active and operating at its normal and full power level (designated as power state P2 in the figure), and the aforementioned enable bit is not asserted. At some point in time between times T0 and T1, the device's operating system determines that the CPU 112 can be placed in a reduced power state. Systems/methods for making such a determination are known in the art.

At time T1, the CPU 112 will be placed into a reduced power state. At a point in time prior to time T1, the CPU preprograms a set of actions (presets) that can be atomically executed in hardware after the CPU is placed in the reduced power state. In particular, a set of interrupt events are designated to serve as wakeup events as mentioned above. The interrupt events so designated can be identified in software executed by the CPU 112 before power to the CPU is reduced. Information identifying the designated events can be written to registers. That is, an interrupt mask can be set up to define sources of interrupts that will be allowed to awaken the CPU 112 after the CPU enters the reduced power state.

At time T1, once the presets are programmed, the CPU 112 writes an enable bit to the register 230 just before entering the reduced power state. The CPU 112 can also save (back up) its context information (e.g., the state of its internal registers) to, for example, the memory 108. Otherwise, the CPU 112 continues to function in its normal fashion up to the point at which the enable bit is set.

Once the enable bit is set, the presets are activated, and the PMIF 222 (specifically, the state machine 228) and the flow controller 235 can be signaled to initiate a hardware-implemented power-down of the CPU 112. Alternatively, after it is signaled, the PMIF 222 can send a signal to the flow controller 235. As noted above, in one embodiment of the invention, the reduction in power is accomplished in hardware via the state machine 228.

If a race condition occurs, in which an event occurs while the CPU 112 is transitioning to the reduced power state, or if an event occurs at the same time the enable bit is set, then power is immediately restored to the CPU so that it can handle the event.

The presets remain active between time T1 and time T2 (region B of FIG. 3). In region B, the CPU 112 is in the reduced power state (designated as power state P1 in FIG. 3) and the enable bit is asserted.

While operating in region B, if an event designated as a wakeup event occurs, then the event is diverted to the PMIF 222. More specifically, the PMIF 222 and the flow controller 235 can be signaled in response to an event designated as a wakeup event. Alternatively, after it is signaled, the PMIF 222 can send a signal to the flow controller 235. In response to the event signal, the enable bit is de-asserted, and the PMIF 222 signals the PMU 104 to restore full power to the CPU 112 so that the event can be subsequently serviced. In an embodiment of the invention, the interrupt handler 226 also latches the interrupt signal so that it can subsequently service the event after full power is restored to the CPU 112.

After time T2, in region C, power has been restored to the CPU 112 and the enable bit has been de-asserted. Accordingly, any subsequent interrupt events will be routed to the interrupt handler 226 but not necessarily to the PMIF 222. The CPU 112 can continue to operate at full power until another determination is made that the CPU can be placed in a reduced power state, in which case the process just described is repeated.

Figure 4:
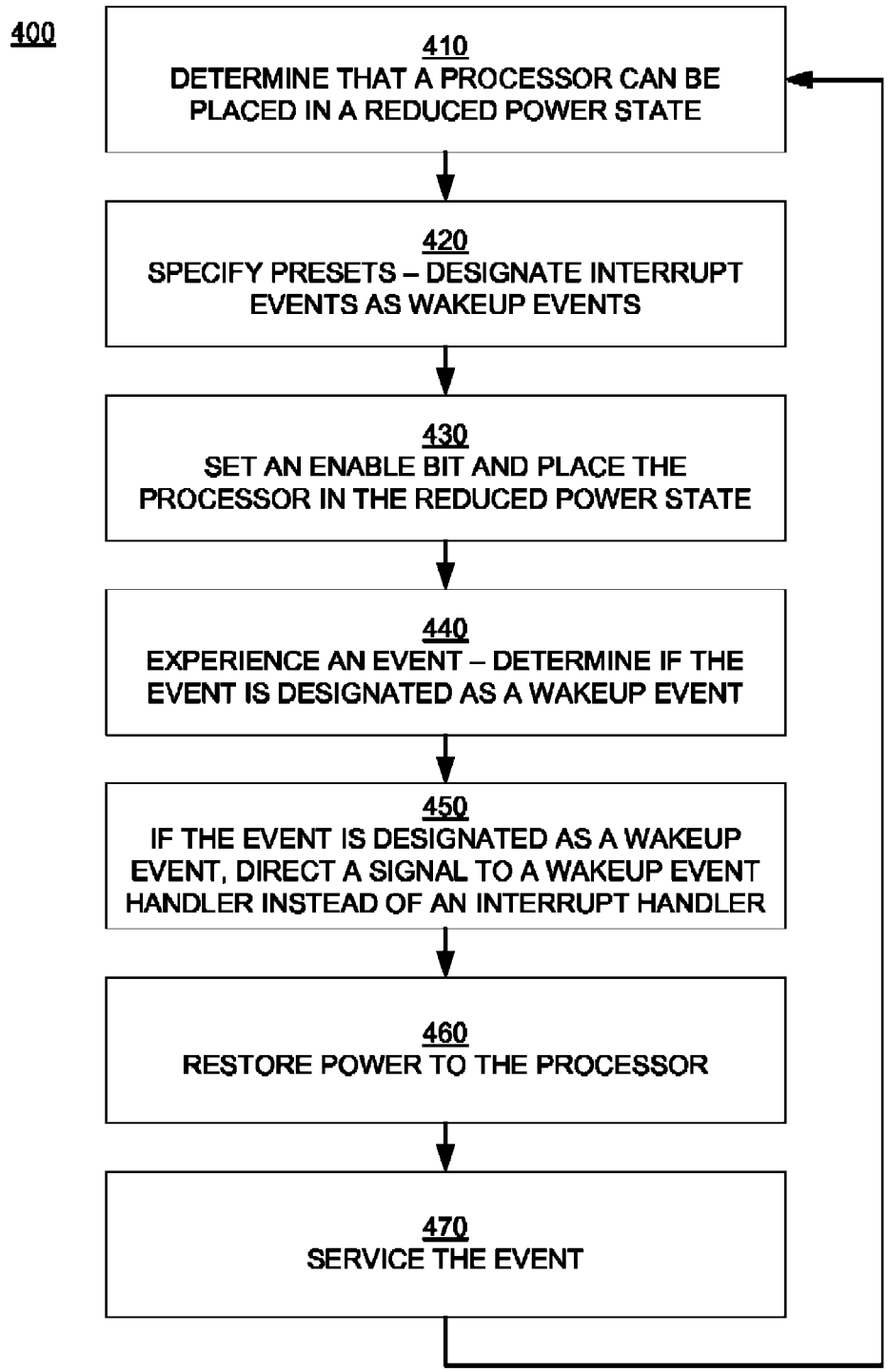
FIG. 4 is a flowchart of a computer-implemented power management method in one embodiment in accordance with the present invention.

FIG. 4 is a flowchart 400 of a computer-implemented power management method in accordance with an embodiment of the present invention. Although specific steps are disclosed in the flowchart 400, such steps are exemplary. That is, embodiments of the present invention are well-suited to performing various other steps or variations of the steps recited in the flowchart 400. Certain aspects of the method of the flowchart 400 can be implemented as computer-executable instructions residing on some form of computer-usable medium in an electronic device that incorporates elements of the systems 100 and 200 (FIGS. 1 and 2). Other aspects of the method of the flowchart 400 (e.g., blocks 450 and 460) can be implemented in hardware.

In block 410 of FIG. 4, a determination is made that a processor (specifically, the CPU 112 of FIG. 1) can be placed in a reduced power state. The determination may be made, for example, by the electronic device's operating system.

In block 420 of FIG. 4, presets are specified. More specifically, actions (presets) that are to go into effect after the CPU 112 is powered down are specified before the CPU is powered down. In one embodiment of the invention, interrupt events are designated as wakeup events.

In block 430, in one embodiment of the invention, an enable bit is set to indicate that the CPU 112 is ready to enter the reduced power state. The CPU 112 sets the enable bit as one of its last actions, and perhaps as its last action, before entering the reduced power state. In effect, the CPU 112 can enter the reduced power state immediately after the enable bit is set. Also, the CPU 112 may back up its internal registers before entering the reduced power state.

By setting the enable bit, the presets are activated and the CPU 112 can then enter the reduced power state (power to the CPU may be reduced, or the CPU may be shut down completely, with no power consumption). The presets will remain in effect as long as the enable bit is set (correspondingly, as long as the CPU 112 remains in the reduced power state).

In block 440, while the CPU 112 is in the reduced power state, an event is experienced. In block 450, if the event has been designated as a wakeup event, then a signal is directed to a wakeup event handler (e.g., the PMIF 222 of FIG. 2) instead of to the interrupt handler 226 (FIG. 2). However, the signal may be latched by the interrupt handler 226 for subsequent handling (after power is restored to the CPU 112).

In block 460 of FIG. 4, the wakeup event handler signals the PMU 104 (FIG. 1) to restore power to the CPU 112. In block 470, after power is restored to the CPU 112, the CPU can service the event.

Thus, according to embodiments of the present invention, the CPU 112 (FIG. 1) can be placed in a reduced power state (e.g., powered down completely). However, power can be restored to the CPU 112 so that it can respond to events, such as interrupt events, that may occur while the CPU is in the reduced power state. More specifically, before the CPU 112 enters the reduced power state, it designates interrupt events, and perhaps other types of events, as wakeup events that will cause power to be restored to the CPU should such an event occur while the CPU is in the reduced power state. Accordingly, hardware (e.g., the PMIF 222 of FIG. 2) can respond to a designated event by awakening the CPU 112 so that the event can be serviced.

Because the CPU 112 can be placed in a reduced power state, power consumption can be reduced, prolonging battery life between charges. However, the CPU 112 remains capable of servicing events that may occur while it is in the reduced power state. It may be possible to employ a mechanism other than what is described above to respond to events like interrupt events while the CPU 112 is at reduced power. However, embodiments according to the invention allow such events to be handled without unnecessarily increasing the complexity of the response. In other words, because the CPU 112 can still service events (after it awakens), implementation of the present invention is transparent to peripheral processes and components. More specifically, up to the point at which the CPU 112 is powered down, and after the point at which power is restored to the CPU, the response to an event is not significantly perturbed by the power conservation techniques described herein.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power management system comprising:
   an interrupt handler operable for sending an interrupt to a first processor in response to an interrupt event, wherein said first processor is operable at different power levels; and
   a power management interface coupled to said interrupt handler and operable for signaling changes in power level for said first processor; wherein said interrupt event is also designated as a wakeup type of event prior to said first processor entering a first power state in which no power is supplied to said first processor; wherein subsequent to said first processor entering said first power state, if said interrupt event occurs, then a signal responsive to said interrupt event is sent to said power management interface; wherein, in response to said signal, said power management interface causes power to be restored to said first processor; and wherein said interrupt handler also latches said signal to allow said interrupt handler and said first processor to respond to said interrupt event after said power is restored to said first processor.

2. The system of claim 1 wherein an enable bit is set to trigger treatment of said interrupt event as said wakeup type of event.

3. The system of claim 2 wherein setting said enable bit indicates said first processor is ready to be placed in said first power state.

4. The system of claim 1 wherein, while said first processor is in said first power state, a signal responsive to said event is also sent to said interrupt handler so that said event can be serviced after power is restored to said first processor.

5. The system of claim 1 wherein said first processor is power-gated.

6. The system of claim 1 further comprising a state machine coupled to said first processor and operable for performing actions associated with entering said first power state, wherein said state machine accomplishes said actions automatically and without requiring said first processor to remain functioning while said actions are performed.

7. The system of claim 1 wherein said first processor is coupled to a second processor, wherein a power level supplied to said first processor is independent of a power level supplied to said second processor.

8. A method of operating a processor to reduce power consumption, said method comprising:
   determining that said processor is eligible to be placed in a first power state, wherein said first power state comprises removing all power from said processor;
   placing said processor in said first power state;
   designating an event as both an interrupt event and as a wakeup event, said designating performed prior to placing said processor into said first power state; and
   if said interrupt event occurs while said processor is in said first power state, then sending a signal to a wakeup event handler in response to said interrupt event, wherein in response to said signal said wakeup event handler causes power to be restored to said processor, and wherein said signal is latched by an interrupt handler to allow said interrupt handler and said processor to respond to said interrupt event after said power is restored to said processor.

9. The method of claim 8 further comprising setting an enable bit to indicate that said interrupt event is also designated as said wakeup event.

10. The method of claim 9 wherein said setting of said enable bit indicates said processor is ready to be placed into said first power state.

11. The method of claim 8 further comprising entering said first power state using a hardware implementation of a state machine that automatically accomplishes actions associated with a transition to said first power state, without requiring said processor to remain functioning during said transition.

12. The method of claim 8 further comprising, before placing said processor in said first power state, backing up information stored in an internal register of said processor.

13. A method of managing power consumption in an electronic system comprising a processor, said method comprising:
   while said processor is not in a first power state, designating a set of interrupt events also as wakeup events, wherein in said first power state all power is removed from said processor;
   subsequent to said designating, placing said processor in said first power state;
   operating said electronic system while said processor in said first power state, wherein said processor is unresponsive to interrupt requests while in said first power state;
   experiencing an interrupt event while said processor is in said first power state;
   with said processor in said first power state, determining whether said interrupt event is also designated as a wakeup event; and
   if said interrupt event is also designated as a wakeup event, then i) directing a signal to a power management interface, wherein in response to said signal said power management interface causes power to be restored to said processor so that said processor can respond to an interrupt request associated with said interrupt event, and ii) latching said signal by an interrupt handler to allow said interrupt handler to service and said processor to respond to said interrupt event after said power is restored to said processor.

14. The method of claim 13 further comprising setting an enable bit to indicate that said interrupt event is also designated as a wakeup event.

15. The method of claim 14 wherein said setting of said enable bit indicates said processor is ready to be placed into said first power state.

16. The method of claim 13 further comprising entering said first power state using a hardware implementation of a state machine that automatically accomplishes actions associated with a transition to said first power state, without requiring said processor to remain functioning during said transition.

* * * * *